No. 880,613. PATENTED MAR. 3, 1908.
J. H. WILLIAMS.
WIRE STRETCHER.
APPLICATION FILED SEPT. 14, 1907.
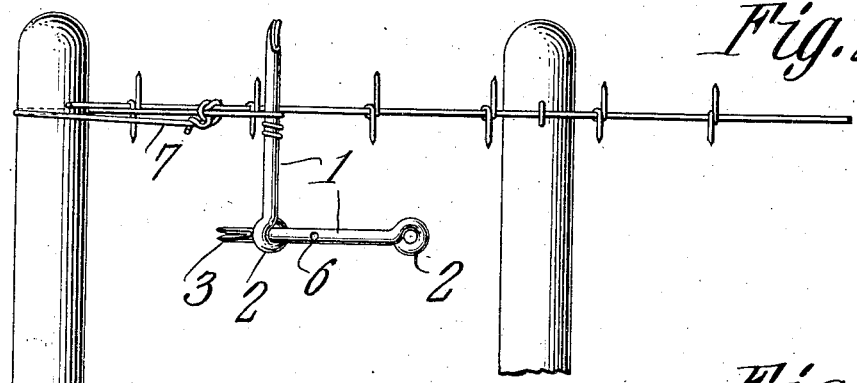
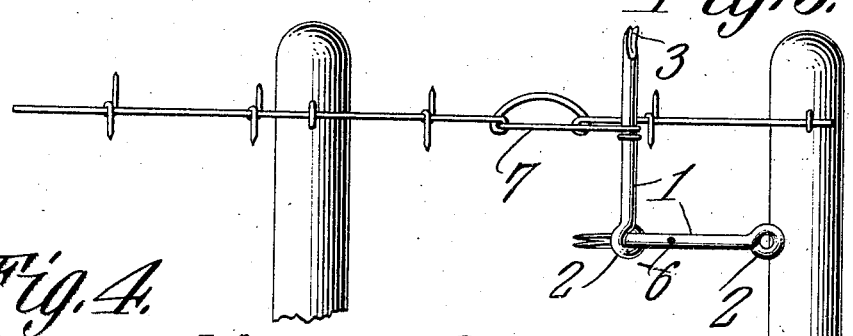
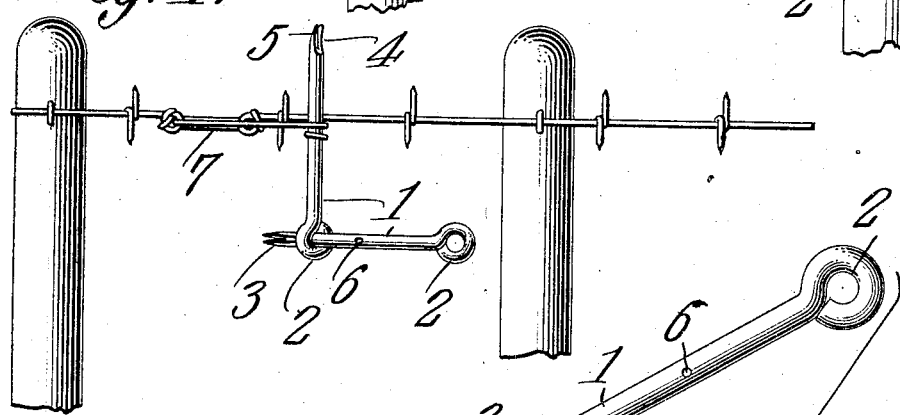
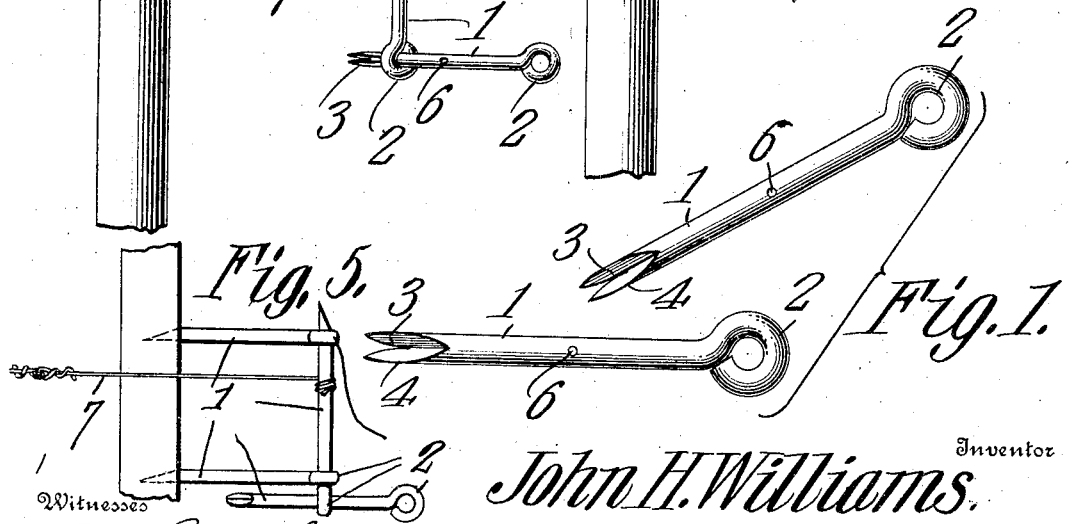

UNITED STATES PATENT OFFICE.

JOHN H. WILLIAMS, OF MILANO, TEXAS, ASSIGNOR OF ONE-HALF TO JOSEPH M. SMITH, OF CAMERON, TEXAS.

WIRE-STRETCHER.

No. 880,613.      Specification of Letters Patent.      Patented March 3, 1908.

Application filed September 14, 1907. Serial No. 392,833.

*To all whom it may concern:*

Be it known that I, JOHN H. WILLIAMS, a citizen of the United States, residing at Milano, in the county of Milam and State of Texas, have invented a new and useful Wire-Stretcher, of which the following is a specification.

This invention has relation to wire stretchers and it consists in the novel construction and arrangement of its parts as hereinafter described.

The object of the invention is to provide an implement of simple construction which may be conveniently used for stretching wire in putting up fences or for taking up slack in the line wires after the fence has been constructed and for other construction and repair work in connection with wire fences.

The implement is made from a bar of iron having an eye formed at one end, the diameter of which is substantially the same as that of the bar. Said bar is provided at its other end with a pair of claws which may be used for drawing staples, nails, etc. The bar is provided at an intermediate point with the perforation which is adapted to receive a tether wire.

In the accompanying drawing:—Figure 1 is a perspective view of two of the stretchers, and Figs. 2, 3, 4 and 5 are views of posts and wire illustrating several of the different ways in which the stretchers may be used.

The implement consists of a bar 1 which is preferably formed from round iron or steel. The bar is provided at one end with an eye 2, the internal diameter of which is substantially the same as that of the bar 1. The bar 1 is provided at its opposite end with the binate pointed claws 3. The said claws have concaved upper surfaces 4 and convexed under surfaces 5 which assist in permitting the claws to be passed under a staple or nail and to be used as pries for drawing such a staple or nail. The bar 1 is provided at an intermediate point with a perforation 6 which extends parallel with the opening through the eye 2. Said perforation 6 is adapted to receive a tether wire 7.

While the implement thus described is of very simple construction it is susceptible of being used to advantage in a number of different ways in constructing a wire fence or for removing slack from the line wires of such a fence or for drawing the ends of adjacent wires together in order that they may be spliced.

In order to draw a line wire as the fence is being constructed, said wire is attached at one end to one post and is passed along a number of posts in the line of the fence. A loop is made in the line wire at a point near its free end. The tether wire 7 is attached to said loop and carried around the end post in the line of fence then back on the said loop and through the same. The end of the tether wire is then passed through the perforation 6 of the bar 1 and the said bar is rotated away from the post around which the tether wire passes. Thus the tether wire is wound upon the bar 1 and the free end of the line wire is drawn toward the post around which the tether wire passes. When the line wire is tightened sufficiently it is stapled to all of the posts in the line of fence. The free end of the said line wire is also stapled to the post around which the tether wire passes. When the line wire is thus secured the rod 1 is turned transversely across the line wire and is rotated so that the tether wire is unwound from the same. In turning the rod 1, in tightening up the line wire, the intermediate portion of a similar rod may be passed through the eye 2 and used as a lever. Thus the two rods coöperate with each other and each may be interchangeably engaged for winding a tether wire.

In order to take up slack at any particular point in the line wire after the fence has been constructed the tether wire 7 is attached at one end of the line wire by means of a loop. A loop is then formed in the line wire at a suitable distance from the first said loop, the tether is passed through the second loop and then to and through the first said loop. The end of the tether wire is then passed through the perforation 6 of the bar 1 and the said bar is rotated as above described, when the loops on the line wire will be drawn together. When the line wire is tightened sufficiently the bar 1 is turned around the line wire and reversely rotated so that the tether wire is turned spirally around part of its own length and the line wire thus holding the said loops toward each other.

By reference to Fig. 5 of the drawing it will be seen that two of the bars 1 may be driven into a post and a third bar may be passed through the eyes 2 of the first said bars and the tether 7 attached to the last said bar and then connected to the line wire about to be stretched. The fourth bar is then passed through the eye of the third mentioned bar which is turned axially and the tether 7 is wound thereon and the line wire is stretched. Thus by being equipped with four separate bars, which occupy a small space, a fence maker may effectually stretch the line wire as indicated.

Thus having described my invention what I claim as new and desire to secure by Letters-Patent is:

1. A wire stretcher consisting of a round bar having at one end an eye, the internal diameter of which is substantially the same as the diameter of the bar the opposite end of the bar being pointed, said bar being provided at an intermediate point with a perforation.

2. A wire stretcher consisting of a round bar, said bar having an eye formed at one end, the internal diameter of which is substantially the same as the diameter of the bar, said bar having at its opposite end pointed binate claws and being provided at an intermediate point with a perforation.

In testimony that I claim the foregoing as my own, I have hereto affixed my signature in the presence of two witnesses.

JOHN H. WILLIAMS.

Witnesses:
R. L. HALE,
F. H. GRAVES.